(12) United States Patent
Kim et al.

(10) Patent No.: US 11,796,960 B2
(45) Date of Patent: Oct. 24, 2023

(54) HOLOGRAPHIC DISPLAY APPARATUS FOR PROVIDING EXPANDED VIEWING WINDOW

(71) Applicants: SAMSUNG ELECTRONICS CO., LTD., Suwon-si (KR); Korea University Research and Business Foundation, Sejong Campus, Sejong-si (KR)

(72) Inventors: Yunhee Kim, Seoul (KR); Hwi Kim, Sejong-si (KR); Hoon Song, Yongin-si (KR); Soobin Kim, Sejong-si (KR); Hongseok Lee, Seoul (KR)

(73) Assignees: SAMSUNG ELECTRONICS CO., LTD., Suwon-si (KR); Korea University Research and Business Foundation, Sejong Campus, Sejong-si (KR)

( * ) Notice: Subject to any disclaimer, the term of this patent is extended or adjusted under 35 U.S.C. 154(b) by 164 days.

(21) Appl. No.: 17/011,080

(22) Filed: Sep. 3, 2020

(65) Prior Publication Data

US 2021/0181678 A1 Jun. 17, 2021

(30) Foreign Application Priority Data

Dec. 11, 2019 (KR) .......................... 10-2019-0164803
Apr. 1, 2020 (KR) .......................... 10-2020-0039707

(51) Int. Cl.
*G02B 5/18* (2006.01)
*G03H 1/22* (2006.01)

(52) U.S. Cl.
CPC ......... *G03H 1/2294* (2013.01); *G03H 1/2205* (2013.01); *G03H 2001/2239* (2013.01);
(Continued)

(58) Field of Classification Search
CPC ............... G03H 1/2294; G03H 1/2205; G03H 2001/2239; G03H 2222/22;
(Continued)

(56) References Cited

U.S. PATENT DOCUMENTS 5,760,885 A * 6/1998 Yokoyama .............. G01S 7/484
356/4.01
6,137,555 A * 10/2000 Tamura ............. G02F 1/133526
349/158
(Continued)

FOREIGN PATENT DOCUMENTS

| KR | 10-2017-0072114 A | 6/2017 |
| KR | 10-2018-0138111 A | 12/2018 |
| KR | 10-2021-0012484 A | 2/2021 |

OTHER PUBLICATIONS

Communication dated Apr. 30, 2021, from the European Patent Office in European Application No. 20207005.8.
(Continued)

*Primary Examiner* — Audrey Y Chang
(74) *Attorney, Agent, or Firm* — Sughrue Mion, PLLC

(57) ABSTRACT

Provided is a holographic display apparatus capable of providing an expanded viewing window when reproducing a holographic image via an off-axis technique. The holographic display apparatus includes a spatial light modulator comprising a plurality of pixels arranged two-dimensionally; and an aperture enlargement film configured to enlarge a beam diameter of a light beam coming from each of the plurality of pixels of the spatial light modulator. The beam diameter of each light beam enlarged by the aperture enlargement film may be greater than the width of an aperture of each pixel of the spatial light modulator.

16 Claims, 22 Drawing Sheets

(52) U.S. Cl.
CPC ..... *G03H 2222/22* (2013.01); *G03H 2223/15* (2013.01); *G03H 2223/18* (2013.01); *G03H 2223/19* (2013.01); *G03H 2223/24* (2013.01); *G03H 2225/23* (2013.01)

(58) Field of Classification Search
CPC ........... G03H 2223/15; G03H 2223/18; G03H 2223/19; G03H 2223/24; G03H 2225/23; G02B 27/0172; G02B 6/0053; G02F 1/133526
USPC .................................. 359/566, 569, 463, 15
See application file for complete search history.

(56) References Cited

U.S. PATENT DOCUMENTS

| | | | |
|---|---|---|---|
| 8,040,589 B2* | 10/2011 | Bita | G02B 6/0053 359/290 |
| 10,133,077 B2* | 11/2018 | Yokoyama | G02B 27/0172 |
| 10,210,823 B2 | 2/2019 | Kim et al. | |
| 2002/0122015 A1* | 9/2002 | Song | G02B 27/0172 345/8 |
| 2011/0075257 A1 | 3/2011 | Hua et al. | |
| 2012/0099194 A1* | 4/2012 | Verschuren | G09F 19/14 359/463 |
| 2016/0327906 A1* | 11/2016 | Futterer | G03H 1/2294 |
| 2018/0120563 A1 | 5/2018 | Kollin et al. | |
| 2018/0129166 A1 | 5/2018 | Seo et al. | |
| 2018/0364641 A1 | 12/2018 | Park et al. | |
| 2019/0171007 A1 | 6/2019 | Gao et al. | |
| 2021/0026298 A1 | 1/2021 | Song et al. | |

OTHER PUBLICATIONS

Park, Jongchan et al., "Ultrathin wide-angle large-area digital 3D holographic display using nonperiodic photon sieve", Nature Communications, 2019, vol. 10, No. 1304, pp. 1-8.

* cited by examiner

HOLOGRAPHIC DISPLAY APPARATUS FOR PROVIDING EXPANDED VIEWING WINDOW

CROSS-REFERENCE TO RELATED APPLICATIONS

This application claims priority from Korean Patent Application Nos. 10-2019-0164803 and 10-2020-0039707, filed on Dec. 11, 2019 and Apr. 1, 2020, in the Korean Intellectual Property Office, the disclosures of which are incorporated herein in their entireties by reference.

BACKGROUND

1. Field

Example embodiments of the present disclosure relate to holographic display apparatuses, and more particularly to, holographic display apparatuses capable of providing an expanded viewing window when reproducing a holographic image via an off-axis technique.

2. Description of the Related Art

Methods such as glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When these methods are used, there is a limitation with regard to the number of viewpoints that may be implemented due to binocular parallax. Also, these methods make the viewers feel tired due to the difference between the depth perceived by the brain and the focus of the eyes.

Holographic 3D image display methods, which provide full parallax and are capable of making the depth perceived by the brain consistent with the focus of the eyes, have been considered. According to such a holographic display technique, when light is irradiated onto a hologram pattern having recorded thereon an interference pattern obtained by interference between object light reflected from an original object and reference light, the light is diffracted and an image of the original object is reproduced. When a currently considered holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

SUMMARY

One or more example embodiments provide holographic display apparatuses capable of providing an expanded viewing window.

Additional aspects will be set forth in part in the description which follows and, in part, will be apparent from the description, or may be learned by practice of example embodiments.

According to an aspect of an example embodiment, there is provided a holographic display apparatus including a spatial light modulator including a plurality of pixels disposed two-dimensionally, and an aperture enlargement film configured to enlarge a beam diameter of a light beam transmitted from each of the plurality of pixels of the spatial light modulator.

The spatial light modulator may include a plurality of apertures and a black matrix surrounding each of the plurality of apertures.

An intensity distribution of the enlarged light beam may decrease from a center of the enlarged light beam to a periphery of the enlarged light beam.

A beam diameter of the enlarged light beam may be greater than a width of each of the plurality of apertures of the spatial light modulator.

A beam diameter of the enlarged light beam may be greater than a pixel period of the spatial light modulator.

The aperture enlargement film may include a light guide layer disposed to face a light exiting surface of the spatial light modulator and a grating layer disposed on an upper surface of the light guide layer opposite to the spatial light modulator.

A thickness of the light guide layer may range from 1 μm to 5 μm.

The grating layer may be configured to transmit a portion of a light beam vertically incident on a lower surface of the grating layer from the light guide layer in a direction perpendicular to an upper surface of the grating layer, and may be configured to reflect a remaining portion of the light beam to propagate obliquely in the light guide layer.

The light guide layer may be configured to obliquely propagate the light beam reflected from the grating layer along an inside of the light guide layer based on total reflection.

The grating layer may be configured to transmit a portion of the light beam obliquely incident on a lower surface of the grating layer from the light guide layer to propagate in a direction perpendicular to an upper surface of the grating layer.

A first light beam perpendicularly incident on the lower surface of the grating layer and transmitted in the direction perpendicular to the upper surface of the grating layer and a second light beam obliquely incident on the lower surface of the grating layer and transmitted in the direction perpendicular to the upper surface of the grating layer may at least partially overlap.

The aperture enlargement film may include a substrate configured to support the light guide layer and the grating layer such that the light guide layer and the grating layer do not bend, and a refractive index of the light guide layer may be greater than a refractive index of the substrate.

The aperture enlargement film may include a first grating layer disposed to face a light exiting surface of the spatial light modulator, a light guide layer disposed on the first grating layer, and a second grating layer disposed on the light guide layer opposite to the first grating layer.

The aperture enlargement film may include a grating layer disposed to face a light exiting surface of the spatial light modulator and a light guide layer disposed on an upper surface of the grating layer opposite to the spatial light modulator.

The holographic display apparatus may further include a backlight unit configured to provide a coherent collimated illumination light to the spatial light modulator, and a Fourier lens configured to focus a holographic image reproduced by the spatial light modulator on a space.

The holographic display apparatus may further include a Gaussian apodization filter array disposed between a light exiting surface of the spatial light modulator and the aperture enlargement film or disposed to face a light entering surface of the spatial light modulator.

The Gaussian apodization filter array may include a plurality of Gaussian apodization filters configured to convert an intensity distribution of a light beam into a curved Gaussian distribution.

The holographic display apparatus may further include a prism array disposed between the spatial light modulator and the aperture enlargement film or disposed to face a light exiting surface of the aperture enlargement film.

The prism array may be divided into a plurality of unit regions that are two-dimensionally disposed, and each of the plurality of unit regions may include a plurality of prisms configured to propagate an incident light in different directions.

The plurality of prisms included in the prism array may correspond one-to-one to a plurality of pixels included in the spatial light modulator.

A first pixel of the spatial light modulator corresponding to a first prism of each of the plurality of unit regions of the prism array may be configured to reproduce a holographic image of a first viewpoint, and a second pixel of the spatial light modulator corresponding to a second prism of each of the plurality of unit regions of the prism array may be configured to reproduce a holographic image of a second viewpoint different from the first viewpoint.

According to another aspect of an example embodiment, there is provided a holographic display apparatus including a spatial light modulator including a plurality of pixels disposed two-dimensionally, the plurality of pixels including a plurality of apertures, respectively, and an aperture enlargement film configured to enlarge a beam diameter of a light beam transmitted from each of the plurality of pixels of the spatial light modulator, wherein a beam diameter of the enlarged light beam is greater than a width of each of the plurality of apertures.

The aperture enlargement film may include a light guide layer disposed to face a light exiting surface of the spatial light modulator and a grating layer disposed on an upper surface of the light guide layer opposite to the spatial light modulator.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
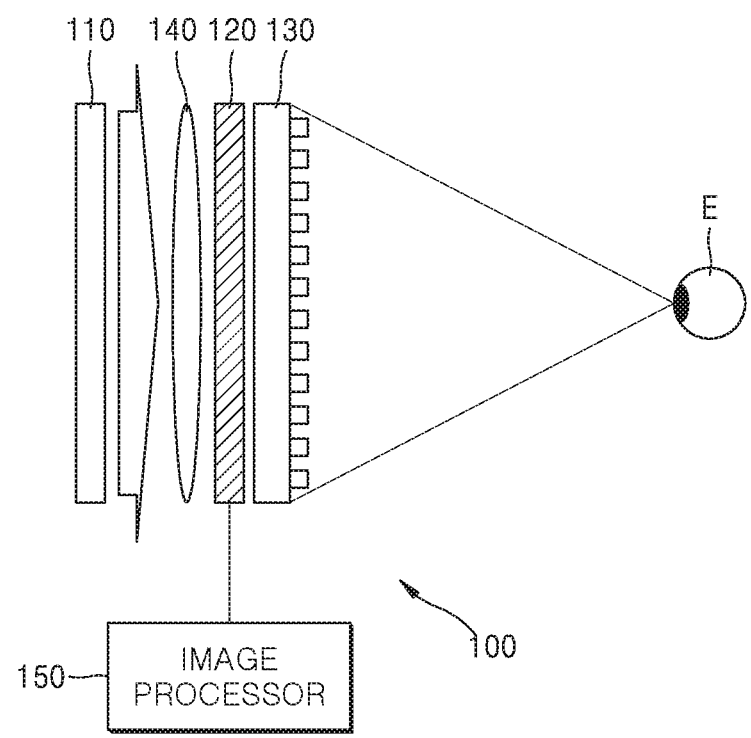
FIG. 1 is a schematic diagram showing a configuration of a holographic display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, with reference to the accompanying drawings, a holographic display apparatus for providing an expanded viewing window will be described in detail. Like reference numerals refer to like elements throughout, and in the drawings, sizes of elements may be exaggerated for clarity and convenience of explanation. The example embodiments described below are merely exemplary, and various modifications may be possible from the example embodiments. In a layer structure described below, an expression "above" or "on" may include not only "immediately on in a contact manner" but also "on in a non-contact manner".

FIG. 1 is a schematic diagram showing a configuration of a holographic display apparatus 100 according to an example embodiment. Referring to FIG. 1, the holographic display apparatus 100 according to an example embodiment may include a spatial light modulator 120 having a plurality of pixels arranged two-dimensionally and an aperture enlargement film 130 disposed to enlarge the beam diameter of light emitted from each pixel of the spatial light modulator 120.

In addition, the holographic display apparatus 100 may further include a backlight unit 110 that provides coherent collimated illumination light to the spatial light modulator 120, a Fourier lens 140 that focuses a holographic image on the space, and an image processor 150 that generates and provides a hologram data signal based on the holographic image to be reproduced to the spatial light modulator 120. In FIG. 1, although the Fourier lens 140 is disposed on the light entering surface of the spatial light modulator 120, that is, between the backlight unit 110 and the spatial light modulator 120, the position of the Fourier lens 140 is necessarily not limited thereto. For example, the Fourier lens 140 may be disposed between the spatial light modulator 120 and the aperture enlargement film 130 or on the light exiting surface of the aperture enlargement film 130.

The backlight unit 110 may include a laser diode to provide illumination light having high coherence. In addition to the laser diode, the backlight unit 110 may include any of other light sources configured to emit light having spatial coherence. In addition, the backlight unit 110 may further include an optical system that enlarges light emitted from the laser diode to generate collimated parallel light having a uniform intensity distribution. Accordingly, the backlight unit 110 may provide parallel coherent illumination light having the uniform intensity distribution to the entire region of the spatial light modulator 120.

The spatial light modulator 120 may be configured to diffract and modulate the illumination light, according to the hologram data signal, for example, a computer-generated hologram (CGH) data signal, provided by the image processor 150. For example, the spatial light modulator 120 may use any one of a phase modulator for performing phase modulation, an amplitude modulator for performing amplitude modulation, and a complex modulator performing both phase modulation and amplitude modulation. Although the spatial light modulator 120 of FIG. 1 is a transmissive spatial light modulator, a reflective spatial light modulator may also be used. The spatial light modulator 120 may include a plurality of display pixels arranged two-dimensionally to display a hologram pattern for diffracting the illumination light. For example, the spatial light modulator 120 may use a liquid crystal device (LCD), a semiconductor modulator, a digital micromirror device (DMD), liquid crystal on silicon (LCoS), etc.

The spatial light modulator 120 may include a two-dimensional grating-shaped black matrix and a plurality of apertures surrounded by the black matrix. A driving circuit for controlling the operation of each aperture is disposed below the black matrix, and each aperture is an active region that changes the intensity or phase of transmissive light or reflective light. The intensity or phase of light passing through each aperture or light reflected by the aperture may be adjusted under the control of the driving circuit. For example, when the spatial light modulator 120 displays the hologram pattern according to the CGH data signal provided from the image processor 150, the intensity or phase of the illumination light may be adjusted differently in the plurality of apertures. When light beams of the illumination light whose intensity or phase is modulated in the plurality of apertures of the spatial light modulator 120 cause interference and focus on the Fourier lens 140, the holographic image may be seen by an observer's eye E. Accordingly, the reproduced holographic image may be determined by the CGH data signal provided from the image processor 150 and the hologram pattern displayed by the spatial light modulator 120 based on the CGH data signal.

Figure 2:
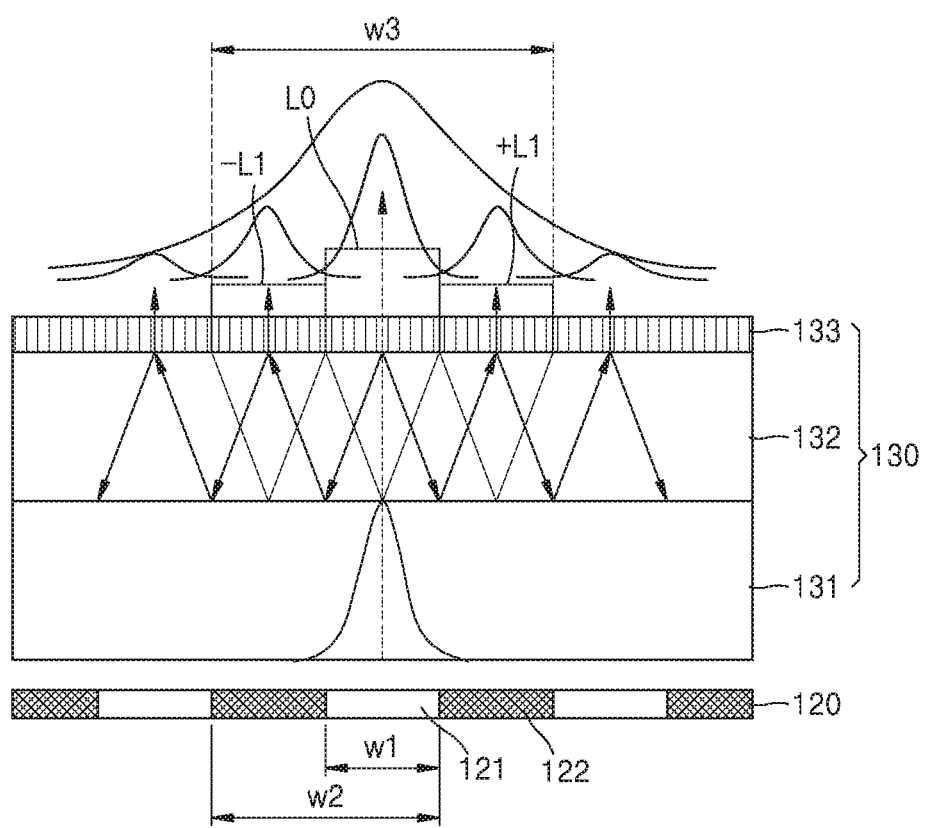
FIG. 2 is a cross-sectional view schematically showing the configuration and operation of an aperture enlargement film according to the example embodiment of the holographic display apparatus shown in FIG. 1.

The aperture enlargement film 130 is configured to enlarge the beam diameter of the light beam of the illumination light passing through or reflected from each aperture of the spatial light modulator 120. For example, FIG. 2 is a cross-sectional view schematically showing the configuration and operation of the aperture enlargement film 130 according to the example embodiment of the holographic display apparatus 100 shown in FIG. 1. Referring to FIG. 2, the aperture enlargement film 130 is disposed to face the light exiting surface of the spatial light modulator 120. The spatial light modulator 120 includes a plurality of apertures 121 and a black matrix 122 surrounding the plurality of apertures 121. Accordingly, a plurality of light beams transmitted from the plurality of apertures 121 of the spatial light modulator 120 respectively is incident on the aperture enlargement film 130.

The aperture enlargement film 130 may include a light guide layer 132 disposed to face the light exiting surface of the spatial light modulator 120 and a grating layer 133 disposed on an upper surface of the light guide layer 132. In addition, the aperture enlargement film 130 may further include a substrate 131 for supporting the light guide layer 132 and the grating layer 133 such that the light guide layer 132 and the grating layer 133 do not bend. However, the substrate 131 may be omitted if the light guide layer 132 is supported without bending itself. In FIG. 2, although the thickness of the substrate 131 is similar to the thickness of the light guide layer 132, the light guide layer 132 may be much thinner than the substrate 131. For example, the thickness of the substrate 131 may be about 0.5 mm to about 1 mm, and the thickness of the light guide layer 132 may be about 1 µm to about 5 µm. The substrate 131 may include glass or a transparent polymer material of a solid material, and the light guide layer 132 may include a transparent material having a higher refractive index than the substrate 131 to transmit light therein.

The grating layer 133 disposed on the upper surface of the light guide layer 132 may emit a portion of light incident on the grating layer 133 from the light guide layer 132 in a direction parallel a direction parallel to a direction normal to the upper surface of the grating layer 133, which is a direction perpendicular to the upper surface of the grating layer 133, and may reflect the remaining portion of the light incident on the grating layer 133 to travel obliquely toward the light guide layer 132. The grating layer 133 may include various types of surface gratings or volume gratings. The surface grating may include, for example, a diffractive optical element (DOE) such as a binary phase grating, a blazed grating, etc. In addition, the volume grating may include, for example, a holographic optical element (HOE), a geometric phase grating, a Bragg polarization grating, a holographically formed polymer dispersed liquid crystal (H-PDLC), etc. Such a volume grating may include periodic fine patterns of materials with different refractive indices. According to the size, height, period, duty ratio, shape, etc. of the periodic grating patterns constituting the grating layer 133, the grating layer 133 may diffract the incident light to cause extinctive interference and constructive interference and change the traveling direction of the incident light.

The light beam transmitted from the aperture 121 of the spatial light modulator 120 may be incident perpendicularly to the lower surface of the substrate 131 and may pass through the substrate 131 and the light guide layer 132, and may be incident perpendicularly to the lower surface of the grating layer 133. The grating layer 133 may emit a 0th order diffracted light beam among incident light beams incident perpendicularly or obliquely to the lower surface of the grating layer 133 in the direction parallel to the direction normal to the upper surface of the grating layer 133, and may reflect a 1st order diffracted light beam to travel obliquely toward the light guide layer 132. The light guide layer 132 is configured to propagate the light beam obliquely reflected from the grating layer 133 along the inside of the light guide layer 132 through total reflection. Therefore, the 1st order diffracted light beam may be totally reflected between the upper surface and the lower surface of the light guide layer 132 and travel along the inside of the light guide layer 132. For example, as indicated by the arrow in FIG. 2, a +1st order diffracted light beam may travel along the right direction of the light guide layer 132, and a −1st order diffracted light beam may travel along the left direction of the light guide layer 132. The arrow in FIG. 2 represents the center of the light beam, and an actual light beam may have a beam diameter equal to a width W1 of the aperture 121. In addition, in the cross-sectional view of FIG. 2, although the −1st order diffracted light beam traveling to the left and the +1st order diffracted light beam traveling to the right are representatively indicated, the first diffracted light beam may travel in all radial directions with respect to the incident position of the grating layer 133.

The 1st order diffracted light beam by the grating layer 133 is totally reflected from the lower surface of the light guide layer 132, and again obliquely incident on the upper surface of the light guide layer 132. Thereafter, a portion of the first diffracted light beam is totally reflected again from the upper surface of the light guide layer 132, while the remaining portion is diffracted by the grating layer 133, and emitted in the direction parallel to the direction normal to the upper surface of the grating layer 133.

Accordingly, the light beam emitted from the grating layer 133 includes a light beam L0 emitted by the 0th order diffraction and a light beam L1 emitted by the 1st order diffraction. In the cross-sectional view of FIG. 2, although light beams −L1 and +L1 emitted by a ±1 order diffraction are respectively shown on the left and right sides of light beam L0 emitted by the 0th order diffraction, the light beam L1 emitted by the 1st order diffraction continuously surrounds the circumference of the light beam L0 emitted by the 0th order diffraction in the shape of a ring. The grating layer 133 may be configured as a two-dimensional grating film capable of diffracting incident light in all directions. The grating layer 133 may be configured by stacking two one-dimensional grating films having orthogonal directions to each other. In this case, for example, the light beam may be enlarged and emitted in the horizontal direction by the one-dimensional grating film in the horizontal direction, and the light beam may be enlarged in the vertical direction by the one-dimensional grating film in the vertical direction, and then the ring-shaped light beam L1 may be finally emitted.

The light beam L1 emitted by the 1st order diffraction may overlap at least partially with the light beam L0 emitted by the 0th order diffraction. The degree to which the light beam L1 emitted by the 1st diffraction and the light beam L0 emitted by the 0th diffraction overlap may vary according to the thickness of the light guide layer 132. When the thickness of the light guide layer 132 is too large, the light beam L1 emitted by the 1st order diffraction may not overlap with the light beam L0 emitted by the 0th order diffraction, and a gap may exist between the light beam L0 emitted by the 0th order diffraction and the light beam L1 emitted by the 1st order diffraction. When the thickness of the light guide layer 132 is gradually reduced, the boundary of the light beam L1 emitted by the 1st order diffraction coincides with the boundary of the light beam L0 emitted by the 0th order diffraction. When the thickness of the light guide layer 132 is further reduced, the light beam L1 emitted by the 1st order diffraction may overlap with the light beam L0 emitted by the 0th order diffraction. Therefore, the maximum thickness of the light guide layer 132 may be selected such that the boundary of the light beam L1 emitted by the 1st order diffraction coincides with the boundary of the light beam L0 emitted by the 0th order diffraction.

As described above, the light beam incident on the aperture enlargement film 130 from each aperture 121 of the spatial light modulator 120 passes through the aperture enlargement film 130 and is divided into the light beam L0 emitted by the 0th order diffraction and the light beam L1 emitted by the 1st order diffraction. These light beams may be combined to be viewed as one enlarged light beam. As a result, the aperture enlargement film 130 may enlarge the beam diameter of the light beam incident from the aperture 121 of the spatial light modulator 120. The beam diameter of the light beam incident on the aperture enlargement film 130 from the aperture 121 of the spatial light modulator 120 is equal to the width W1 of the aperture 121. However, the beam diameter of the light beam enlarged while passing through the aperture enlargement film 130 may be the same as a beam diameter W3 of a light beam combining the light beam L0 emitted by the 0th order diffraction and the light beam L1 emitted by the 1st order diffraction, and may be greater than the width W1 of the aperture 121 of the spatial light modulator 120.

The beam diameter W3 of the light beam enlarged by the aperture enlargement film 130 may vary according to the degree to which the light beam L0 emitted by the 0th order diffraction and the light beam L1 emitted by the 1st order diffraction overlap. As the degree of overlap is based on the thickness of the light guide layer 132, the beam diameter W3 of the light beam enlarged by the aperture enlargement film 130 may be determined by the thickness of the light guide layer 132. For example, the thickness of the light guide layer 132 may be selected such that the beam diameter W3 of the light beam enlarged by the aperture enlargement film 130 is greater than a pitch W2 of a pixel of the spatial light modulator 120. The pitch W2 of the pixel of the spatial light modulator 120 is equal to the sum of the width W1 of the aperture 121 and the width of the black matrix 122.

In the related example, due to the black matrix 122 existing between the apertures 121, there is a gap having no image information between the plurality of light beams transmitted from the plurality of apertures 121 of the spatial light modulator 120. The gap between the light beams may increase the intensity of a higher order diffraction pattern. Meanwhile, according to the example embodiment, because the aperture enlargement film 130 enlarges the beam diameter of each light beam, the intensity of the high order diffraction pattern may decrease and ultimately the high order diffraction pattern may be removed.

Meanwhile, the intensity of the light beam L0 emitted by the 0th order diffraction is greater than the intensity of the light beam L1 emitted by the 1st order diffraction. Therefore, the light beam enlarged by the aperture enlargement film 130 has a shape in which the intensity decreases from the center of the light beam to the periphery, and has a shape approximately similar to a Gaussian distribution. According to the example embodiment, due to the enlarged light beam having a distribution having a beam diameter greater than the width W1 of the aperture 121 of the spatial light modulator 120 and having the intensity decreasing from the center to the periphery, the spatial light modulator 120 may reduce high order noise generated in the focal plane of the Fourier lens 140 such that a viewing window through which a holographic image is visible may be enlarged.

As described above, because the spatial light modulator 120 is configured with an array of the plurality of apertures 121 and the black matrix 122, a physical structure of the spatial light modulator 120 may function as a regular diffraction grating. Thus, the illumination light may be diffracted and interfered with by the hologram pattern formed by the spatial light modulator 120 and also by a regular structure constituting the spatial light modulator 120. Also, some of the illumination light may not be diffracted by the hologram pattern, but may pass through the spatial light modulator 120 as is. As a result, a plurality of lattice spots may appear on the focal plane or the pupil plane of the Fourier lens 140 on which the holographic image is converged to a point. The plurality of lattice spots may function as image noise that degrades quality of the reproduced holographic image and makes it uncomfortable to observe the holographic image. For example, a 0th order noise formed by the illumination light which is not diffracted may appear on an axis of the Fourier lens 140.

Also, multiple high order noise of a regular lattice pattern may appear around a 0th order noise by interference between light diffracted by the regular pixel structure of the spatial light modulator 120. However, as shown in FIG. 2, when the aperture enlargement film 130 is used together with the spatial light modulator 120, the multiple high order noise having the regular lattice structure may be reduced to enlarge a viewing window.

Figure 3A:
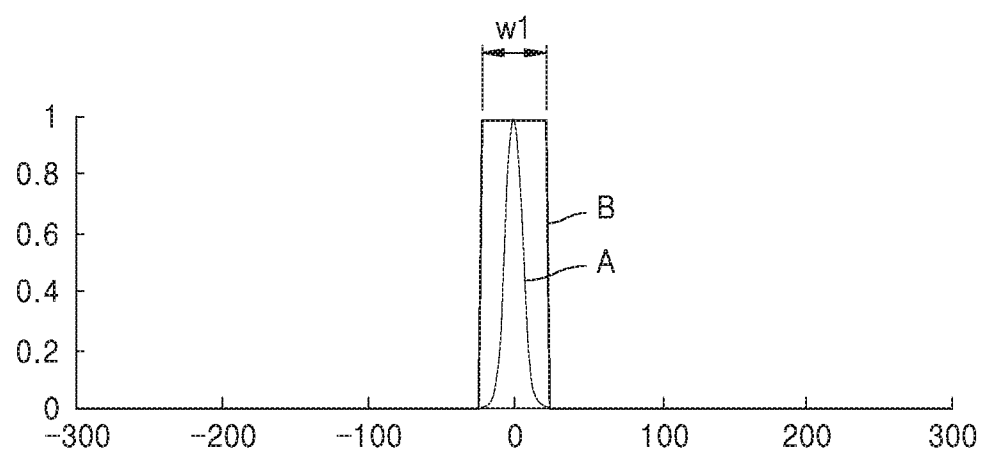
FIG. 3A shows the intensity distribution of illumination light transmitted through an aperture of a spatial light modulator when only the spatial light modulator is used without an aperture enlargement film.
Figure 3B:
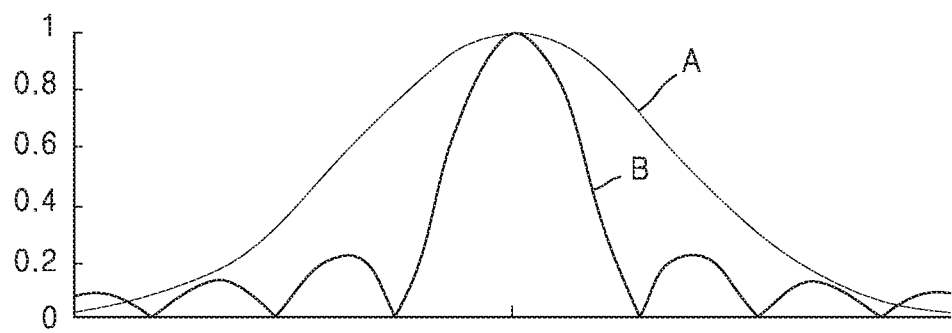
FIGS. 3B and 3C show a light intensity distribution formed by the illumination light transmitted through the aperture of the spatial light modulator on the focal plane of a Fourier lens in the case of FIG. 3A.
Figure 3C:
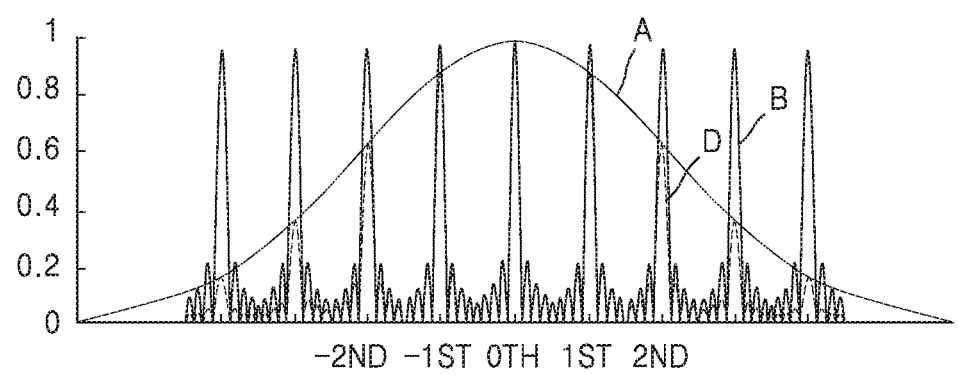

For example, FIG. 3A shows the intensity distribution of illumination light transmitted through the aperture 121 of the spatial light modulator 120 without the aperture enlargement film 130, and FIGS. 3B and 3C show a light intensity distribution formed by the illumination light of FIG. 3A on the focal plane of the Fourier lens 140. In particular, FIG. 3B shows the light intensity distribution formed by one pixel, and FIG. 3C shows the light intensity distribution formed when a plurality of adjacent pixels are simultaneously turned on.

In FIG. 3A, graph B indicates the intensity distribution of the illumination light of a uniform distribution transmitted through the aperture 121 of the spatial light modulator 120, and has a uniform distribution across the width W1 of the aperture 121. In FIG. 3A, graph A indicates the intensity distribution when the illumination light of the uniform distribution indicated by graph B passes through a Gaussian apodization filter, and shows a Gaussian distribution. In the absence of the aperture enlargement film 130, the beam diameter of the illumination light transmitted through the aperture 121 of the spatial light modulator 120 is substantially the same as the width W1 of the aperture 121 of the spatial light modulator 120. Because the width W1 of the aperture 121 of the spatial light modulator 120 is smaller than the pixel period of the spatial light modulator 120, the beam diameter of the illumination light transmitted through the aperture 121 of the spatial light modulator 120 is also smaller than the pixel period of the spatial light modulator 120.

The graph A in FIG. 3B showing the light intensity distribution formed by one pixel shows an intensity distribution after the illumination light having the Gaussian distribution indicated by graph A in FIG. 3A expands on the focal plane of the Fourier lens 140 due to the diffraction phenomenon by the aperture 121 of the spatial light modulator 120. In addition, a graph B in FIG. 3B shows a light intensity distribution formed on the focal plane of the Fourier lens 140 due to the diffraction when the illumination light having the uniform intensity distribution indicated by graph B in FIG. 3A passes through the aperture 121 of one pixel of the spatial light modulator 120.

The graph B in FIG. 3C showing the light intensity distribution formed on the focal plane of the Fourier lens 140 by a plurality of adjacent pixels shows a light intensity distribution formed on the focal plane of the Fourier lens 140 due to the diffraction when the illumination light having the uniform intensity distribution indicated by graph B in FIG. 3A passes through the apertures 121 of the plurality of adjacent pixels of the spatial light modulator 120. The central peak of the graph B in FIG. 3C is generated by the $0^{th}$ order diffraction, and surrounding peaks are generated by high order diffraction of ±1st order or higher. Accordingly, an interference pattern formed by the illumination light having the Gaussian distribution indicated by graph A in FIG. 3A may be the same as the product of the graph A in FIG. 3B and the graph B in FIG. 3C, and is indicated by a graph D in FIG. 3C. As shown by the graph D in FIG. 3C, because the distribution of the graph A expanded on the focal plane includes the peaks by high order diffraction of the graph B, even if the illumination light having the Gaussian distribution indicated by graph A in FIG. 3A is used, the interference pattern due to 0th order diffraction and high order diffraction is generated.

Figure 3D:
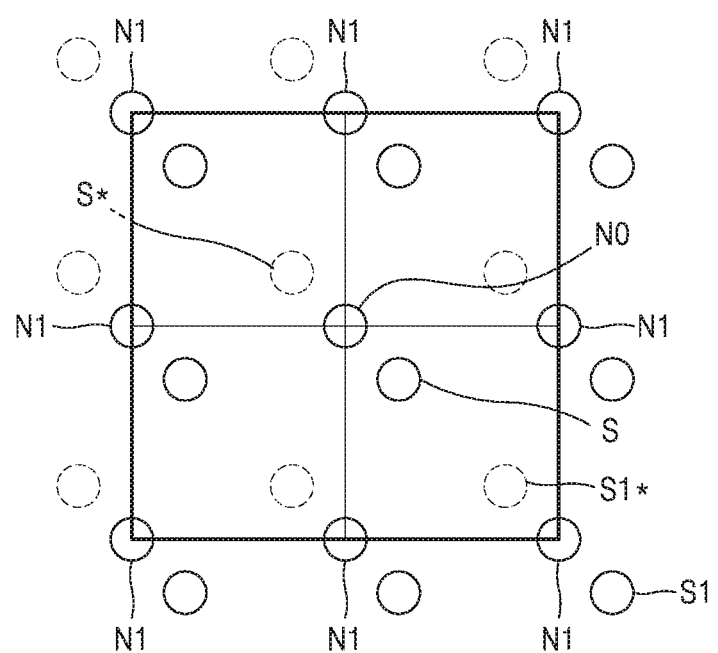
FIG. 3D shows the distribution of light formed on the focal plane of the Fourier lens by a holographic display apparatus according to a related example in the case of FIG. 3A.

FIG. 3D shows the distribution of light formed in the focal plane of the Fourier lens 140 by a holographic display apparatus according to the related example shown in FIG. 3A. The holographic display apparatus according to the related example may have a structure without the aperture enlargement film 130 in the configuration shown in FIG. 1. Referring to FIG. 3D, 0th order noise N0 due to 0th order diffraction is formed on the center of the focal plane, that is, on the optical axis. In addition, in the periphery of the 0th order noise N0, high order noises N1 generated by high order diffraction of ±1st order or higher are regularly formed in the form of a lattice. In FIG. 3D, a rectangle indicated by a thick solid line surrounded by the high order noises N1 becomes a viewing window of the holographic display apparatus determined by the resolution of the spatial light modulator 120.

In order to prevent or reduce such the multiple noises N0 and N1 from being visible by an observer, a holographic image may be reproduced via an off-axis technique such that the spot of the holographic image is reproduced by avoiding the multiple noises N0 and N1. Because the multiple noises N0 and N1 are generated by the physical internal structure of the spatial light modulator 120 and are independent of the hologram pattern displayed by the spatial light modulator 120, the positions of the noises N0 and N1 are always fixed. Because the spot position of the holographic image is determined by the hologram pattern displayed by the spatial light modulator 120, a holographic pattern may be formed such that the holographic image is reproduced on a position that does not include the multiple noises N0 and N1. For example, the image processor 150 may add a prism phase to CGH data including holographic image information. Then, the holographic image may be reproduced away from the optical axis by a prism pattern displayed together with the hologram pattern by the spatial light modulator 120. Therefore, the reproduced holographic image may be away from the 0th order noise N0.

For example, as illustrated in FIG. 3D, a holographic image signal S may be positioned slightly away from the 0th order noise N0 in a diagonal direction by using an off-axis technique. In the case of the off-axis technique, a complex conjugate image signal S* may be generated in the opposite direction of the holographic image signal S with respect to the 0th order noise N0. However, even when using the off-axis technique, because the expression limit of the prism phase is smaller than the pixel period of the spatial light modulator 120, the holographic image signal S may not be positioned farther away than the high order noise N1 as shown in FIG. 3D. Therefore, the high order noise N1 makes it difficult to enlarge the viewing window and interferes with the viewing of the holographic image. In addition, holographic image signals S1 by a high order diffraction in the diagonal direction with respect to the high order noises N1 and their complex conjugate image signals S1* may be generated together. The holographic image signal S1 by the high order diffraction and its complex conjugate image signal S1* may also interfere with the viewing of the holographic image.

Figure 4A:
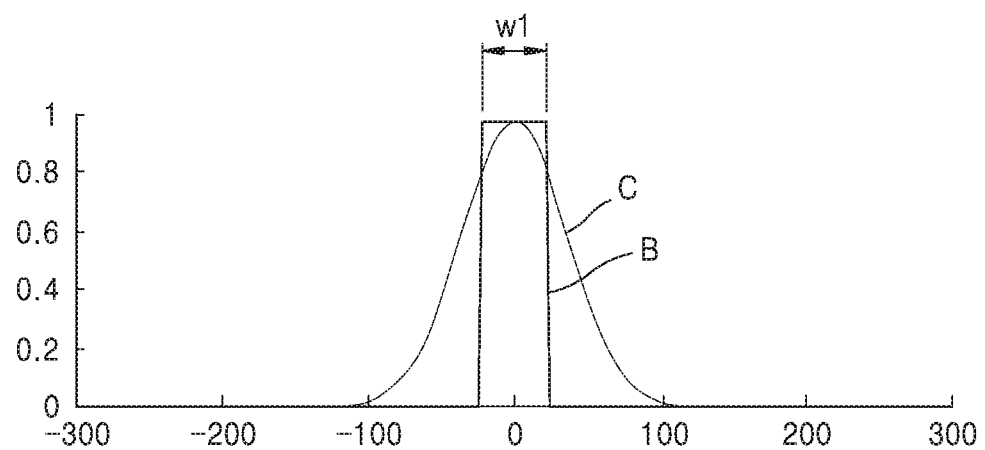
FIG. 4A shows an intensity distribution of illumination light transmitted through an aperture of a spatial light modulator and an aperture enlargement film when the spatial light modulator and the aperture enlargement film are used.
Figure 4B:
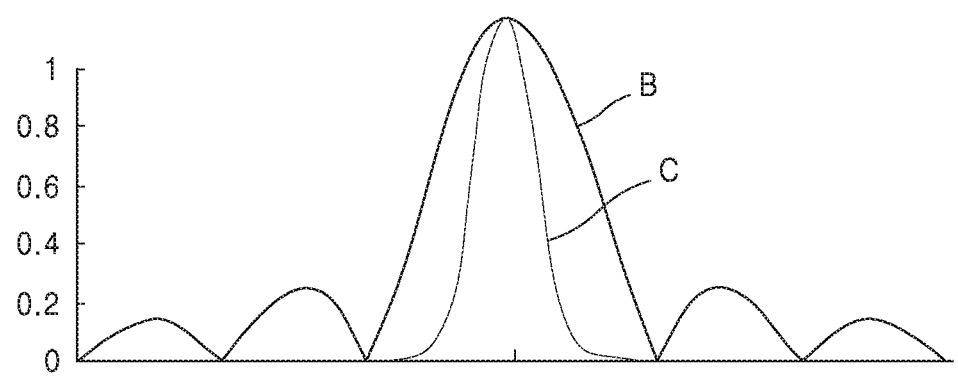
FIGS. 4B to 4D show light intensity distributions that the illumination light transmitted through the aperture and the aperture enlargement film of the spatial light modulator forms on the focal plane of a Fourier lens in the case of FIG. 4A.
Figure 4C:
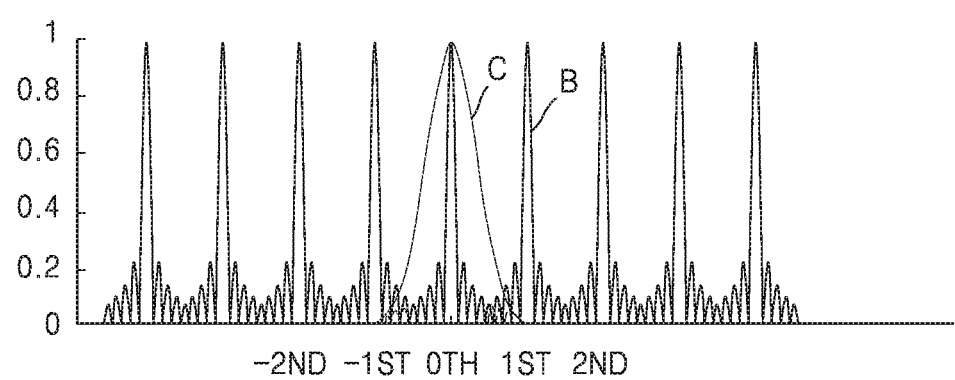
Figure 4D:
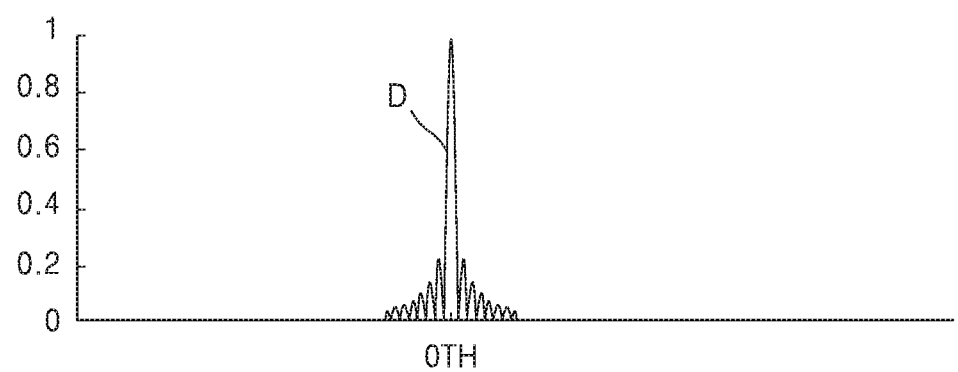

FIG. 4A shows an intensity distribution of illumination light transmitted through the aperture 121 of the spatial light modulator 120 and the aperture enlargement film 130. In addition, FIGS. 4B to 4D show light intensity distributions that the illumination light of FIG. 4A forms on the focal plane of the Fourier lens 140. In particular, FIG. 4B shows the light intensity distribution formed by one pixel, FIG. 4C shows the light intensity distribution formed when a plurality of adjacent pixels are simultaneously turned on, and FIG. 4D shows a light intensity distribution formed on the focal plane of the Fourier lens 140 due to the diffraction of the illumination light transmitted through the aperture 121 of the spatial light modulator 120 and the aperture enlargement film 130.

In FIG. 4A, graph B indicates the intensity distribution of the illumination light transmitted through the aperture 121 of the spatial light modulator 120, and a graph C indicates the intensity distribution of the illumination light transmitted through the aperture 121 of the spatial light modulator 120 and the aperture enlargement film 130. As shown in FIG. 4A, it is assumed that the intensity of the illumination light transmitted through the aperture 121 of the spatial light modulator 120 and the aperture enlargement film 130 has the Gaussian distribution. When using the aperture enlargement film 130, the beam diameter of the illumination light may be greater than the width W1 of the aperture 121 of the spatial light modulator 120 and may be greater than the pixel period of the spatial light modulator 120. This may have the same effect that optically the aperture 121 of the light modulator 120 through which the illumination light passes is greater than the pixel period of the spatial light modulator 120. For example, the aperture enlargement film 130 may provide an effect such as enlarging the aperture 121 of the spatial light modulator 120.

The graph B in FIG. 4B showing the light intensity distribution formed by one pixel is the same as the graph B in FIG. 3B. For example, the graph B in FIG. 4B is the light intensity distribution formed on the focal plane of the Fourier lens 140 due to the diffraction of the illumination light having a uniform intensity distribution that passes through the aperture 121 of the spatial light modulator 120 but does not pass through the aperture enlargement film 130. The graph C in FIG. 4B shows the light intensity distribution formed by the illumination light having the intensity distribution indicated by graph C in FIG. 4A on the focal plane of the Fourier lens 140 without considering interference. The illumination light having the intensity distribution indicated by graph C in FIG. 4A is rarely enlarged on the focal plane of the Fourier lens 140, as shown in FIG. 4B, due to an optical effect such that the aperture 121 of the spatial light modulator 120 is enlarged.

The graph B in FIG. 4C showing the light intensity distribution formed on the focal plane of the Fourier lens 140 by a plurality of adjacent pixels is the light intensity distribution formed on the focal plane of the Fourier lens 140 due to the diffraction when the illumination light having a uniform intensity distribution indicated by graph B in FIG. 4A passes through the apertures 121 of the plurality of adjacent pixels of the spatial light modulator 120. The central peak of the graph B in FIG. 3C is generated by the $0^{th}$ order diffraction, and surrounding peaks are generated by high order diffraction of ±1st order or higher.

An interference pattern formed by the illumination light having the Gaussian distribution indicated by graph C in FIG. 4A may be the same as the product of the graph C in FIG. 4B and the graph B in FIG. 4C, and is indicated by a graph D in FIG. 4D. The distribution of the graph C in FIG. 4B may include only peak due to a 0th order diffraction of the graph B in FIG. 4C, as shown in FIG. 4C. Therefore, when using the illumination light of a wide beam diameter having the Gaussian distribution indicated by graph C in FIG. 4A, as shown in FIG. 4D, only the interference pattern due to the 0th order diffraction occurs, and an interference pattern due to a high order diffraction does not appear.

Figure 4E:
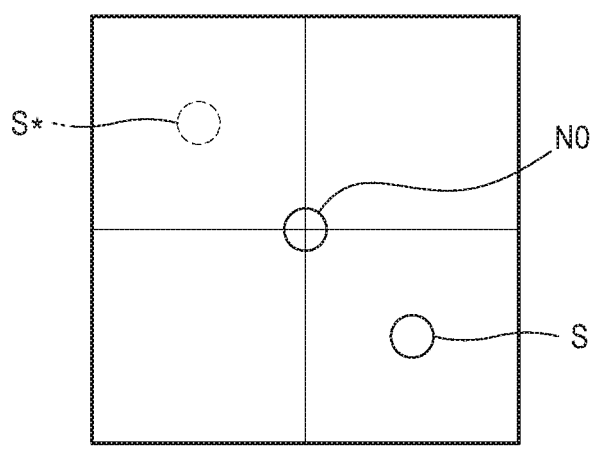
FIG. 4E shows the distribution of light formed on the focal plane of the Fourier lens by a holographic display apparatus according to an embodiment in the case of FIG. 4A.

FIG. 4E shows the distribution of light formed on the focal plane of the Fourier lens 140 by the holographic display apparatus according 100 of FIG. 4A. Referring to FIG. 4E, on the focal plane of the Fourier lens 140, only the $0^{th}$ order noise N0, the holographic image signal S, and the complex conjugate image signal S* appear, and the high order noises N1, the holographic image signals S1 by the high order diffraction and their complex conjugate image signals S1* illustrated in FIG. 3D hardly appear. Therefore, by using the aperture enlargement film 130, the observer may view the holographic image without being disturbed by the high order noise N1 and in a wider region.

Figure 5:
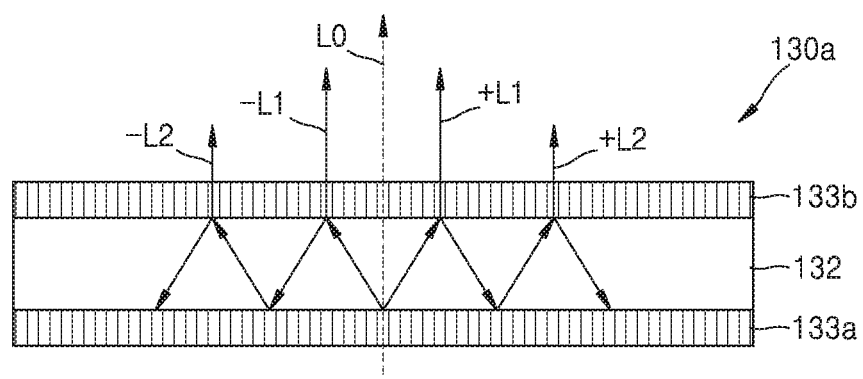
FIG. 5 is a cross-sectional view schematically showing the configuration and operation of an aperture enlargement film according to another example embodiment.

The aperture enlargement film 130 may be manufactured in various other structures in addition to the structure shown in FIG. 2. For example, FIG. 5 is a cross-sectional view schematically showing the configuration and operation of an aperture enlargement film 130a according to another example embodiment. Referring to FIG. 5, the aperture enlargement film 130a may include a first grating layer 133a disposed to face the light exiting surface of the spatial light modulator 120, the light guide layer 132 disposed on the first grating layer 133a, and a second grating layer 133b disposed on the light guide layer 132. The light guide layer 132 is disposed between the first grating layer 133a and the second grating layer 133b. The first grating layer 133a and the second grating layer 133b may include various types of surface gratings or volume gratings. For example, the first grating layer 133a and the second grating layer 133b may have different periodic grating patterns in the size, height, period, duty ratio, and shape from the grating layer 133 illustrated in FIG. 2.

The aperture enlargement film 130a may be disposed such that the first grating layer 133a faces the light exiting surface of the spatial light modulator 120. A light beam transmitted from the aperture 121 of the spatial light modulator 120 is first incident perpendicularly on the lower surface of the first grating layer 133a. The first grating layer 133a may be configured to diffract an incident light that is incident perpendicularly on the lower surface. For example, the first grating layer 133a may be configured to 0th diffract a portion of the incident light that is incident perpendicularly on the lower surface and travel in a direction parallel to the direction normal to the upper surface. Therefore, the traveling direction of a light beam that is 0th diffracted by the first grating layer 133a does not change. Also, the first grating layer 133a may be configured to 1st diffract a portion of the incident light that is incident perpendicularly on the lower surface and travel in an inclined direction with respect to the upper surface.

The light beam that is 0th diffracted by the first grating layer 133a may be incident perpendicularly on the upper surface of the light guide layer 132, and the light beam that is 1st diffracted may be obliquely incident on the upper surface of the light guide layer 132. The second grating layer 133b is disposed on the upper surface of the light guide layer 132. The second grating layer 133b may be configured to propagate a portion of the incident light that is incident on the lower surface in the direction parallel to the direction normal to the upper surface. Therefore, the light beam perpendicularly incident on the upper surface of the light guide layer 132 from the first grating layer 133a is emitted through the second grating layer 133b without changing the traveling direction. A portion of the light beam obliquely incident on the upper surface of the light guide layer 132 from the first grating layer 133a is emitted in the direction parallel to the direction normal to the upper surface of the second grating layer 133b through the second grating layer 133b. The remaining portion of the light beam obliquely incident on the upper surface of the light guide layer 132 from the first grating layer 133a is totally reflected from the upper surface of the light guide layer 132 and travels in a lateral direction along the inside of the light guide layer 132. In this process, a portion of the light beam is emitted through the second grating layer 133b whenever the light beam is incident on the upper surface of the light guide layer 132.

Therefore, the light beam incident on the aperture enlargement film 130a is divided into a plurality of light beams −L2, −L1, L0, +L1, and +L2 and is emitted from the aperture enlargement film 130a. The thickness of the light guide layer 132 may be selected such that the plurality of light beams −L2, −L1, L0, +L1, and +L2 overlap at least partially. Then, the plurality of light beams −L2, −L1, L0, +L1, and +L2 emitted from the aperture enlargement film 130a may be viewed as one enlarged light beam. As a result, the aperture enlargement film 130a may enlarge the beam diameter of the light beam incident from the aperture 121 of the spatial light modulator 120. Further, because the intensity of the light beam L0 is greater than the intensity of the surrounding light beams −L1 and +L1, and the intensity of the light beams −L1 and +L1 is greater than the intensity of the surrounding light beams −L2 and +L2, the light beam enlarged by the aperture enlargement film 130a may have a shape similar to the Gaussian distribution in which the intensity decreases from the center to the periphery.

Figure 6:
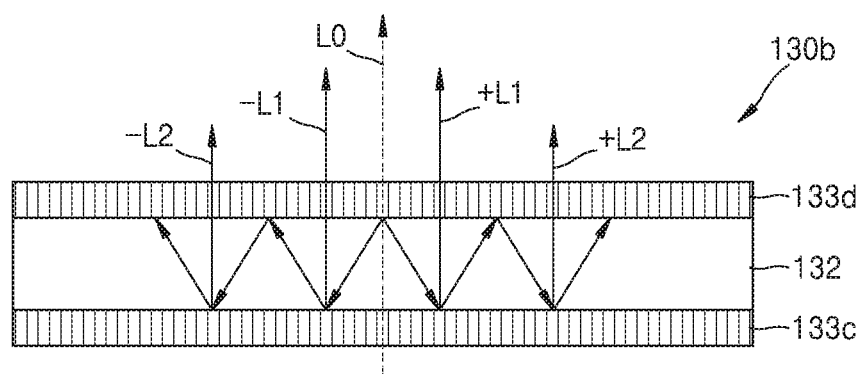
FIG. 6 is a cross-sectional view schematically showing the configuration and operation of an aperture enlargement film according to another example embodiment.

FIG. 6 is a cross-sectional view schematically showing the configuration and operation of an aperture enlargement film 130b according to another example embodiment. Referring to FIG. 6, the aperture enlargement film 130b may include a third grating layer 133c, the light guide layer 132, and a fourth grating layer 133d. The light guide layer 132 is disposed between the third grating layer 133c and the fourth grating layer 133d. The third grating layer 133c and the fourth grating layer 133d may have different periodic grating patterns in the size, height, period, duty ratio, and shape from the first and second grating layers 133a and 133b shown in FIG. 5.

The aperture enlargement film 130b may be disposed such that the third grating layer 133c faces the light exiting surface of the spatial light modulator 120. Then, a light beam transmitted from each aperture 121 of the spatial light modulator 120 is first incident perpendicularly on the lower surface of the third grating layer 133c. The third grating layer 133c may be configured to transmit an incident light that is incident perpendicularly on the lower surface as is. Accordingly, the light beam incident on the lower surface of the third grating layer 133c may be incident perpendicularly on the lower surface of the fourth grating layer 133d through the light guide layer 132. In addition, the third grating layer 133c may be configured to reflect a portion of an incident light obliquely incident on the upper surface in a direction perpendicular to the upper surface.

The fourth grating layer 133d may 0th and 1st diffract the incident light perpendicularly incident on the lower surface to travel in different directions. For example, the light beam that is 0th diffracted by the fourth grating layer 133d may be emitted in a direction parallel to the direction normal to the upper surface of the fourth grating layer 133d, and the light beam that is 1st diffracted may obliquely travel toward the light guide layer 132. Then, the light beam that is 1st diffracted by the fourth grating layer 133d travels in a lateral direction inside the light guide layer 132 through total reflection.

In a process of traveling inside the light guide layer 132 in the lateral direction, a portion of the light beam may be diffracted by the upper surface of the third grating layer 133c and again be incident perpendicularly on the lower surface of the fourth grating layer 133d. The light beam incident on the aperture enlargement film 130b from the spatial light modulator 120 is divided into the plurality of light beams −L2, −L1, L0, +L1, and +L2 in this manner, and is output from the aperture enlargement film 130b.

Figure 7:
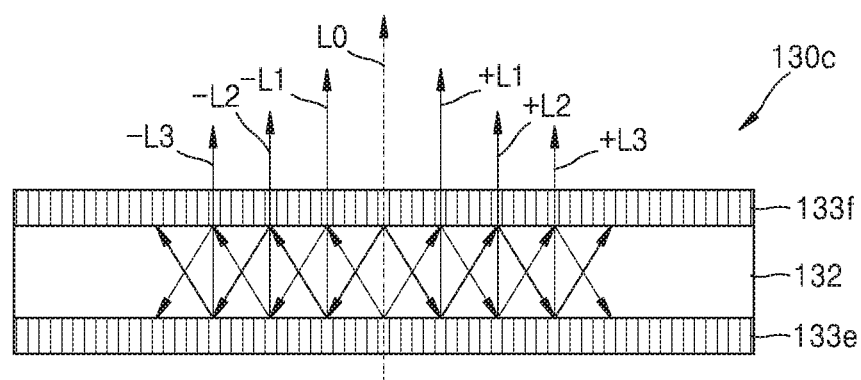
FIG. 7 is a cross-sectional view schematically showing the configuration and operation of an aperture enlargement film according to another example embodiment.

In addition, FIG. 7 is a cross-sectional view schematically showing the configuration and operation of an aperture enlargement film 130c according to another example embodiment. Referring to FIG. 7, the aperture enlargement film 130c may include a fifth grating layer 133e, a fourth grating layer 133d, and the light guide layer 132 disposed between the fifth grating layer 133e and the fourth grating layer 133d.

A light beam transmitted from each aperture 121 of the spatial light modulator 120 is first incident perpendicularly on the lower surface of the fifth grating layer 133e. The fifth grating layer 133e may be configured to 0th diffract a portion of the incident light that is incident perpendicularly on the lower surface and travel in a direction parallel to the direction normal to the upper surface of the fifth grating layer 133e. Also, the fifth grating layer 133e may be configured to 1st diffract a portion of the incident light that is incident perpendicularly on the lower surface and travel in an inclined direction with respect to the upper surface of the fifth grating layer 133e. Then, the light beam that is 0th diffracted by the fifth grating layer 133e may be incident perpendicularly on the lower surface of the fourth grating layer 133d, and the light beam that is 1st diffracted may be obliquely incident on the upper surface of the light guide layer 132.

In addition, the fifth grating layer 133e may be configured to diffract a portion of the incident light that is obliquely incident on the upper surface and travel in the direction parallel to the direction normal to the upper surface. There is a common point between the fifth grating layer 133e illustrated in FIG. 7 and the first grating layer 133a illustrated in FIG. 5 in that the 0th order diffracted light in the incident light incident perpendicularly on the lower surface travels in the direction perpendicular to the upper surface, and the 1st order diffracted light travels in the inclined direction with respect to the upper surface. However, the first grating layer 133a is different from the fifth grating layer 133e in that the first grating layer 133a does not diffract the incident light obliquely incident on the upper surface in the direction normal to the upper surface. In addition, the third grating layer 133c illustrated in FIG. 6 is different from the fifth grating layer 133e in that the incident light incident perpendicularly on the lower surface does not travel in the inclined direction with respect to the upper surface. To this end, the fifth grating layer 133e may have a periodic grating pattern different from the first grating layer 133a and the third grating layer 133c in the size, height, period, duty ratio, shape, etc.

The fourth grating layer 133d illustrated in FIG. 7 is the same as the fourth grating layer 133d illustrated in FIG. 6. Accordingly, a portion of the incident light incident perpendicularly on the lower surface of the fourth grating layer 133d is emitted in the direction parallel to the direction normal to the upper surface, and the remaining portion obliquely travels in the lateral direction along the light guide layer 132. In a process of traveling inside the light guide layer 132 in the lateral direction through total reflection, a portion of the light beam may be diffracted by the upper surface of the fifth grating layer 133e and again incident perpendicularly on the lower surface of the fourth grating layer 133d. The light beam incident on the aperture enlargement film 130c from the spatial light modulator 120 is divided into a plurality of light beams −L3, −L2, −L1, L0, +L1, +L2, and +L3 in this manner, and is output from the aperture enlargement film 130c.

Figure 8:
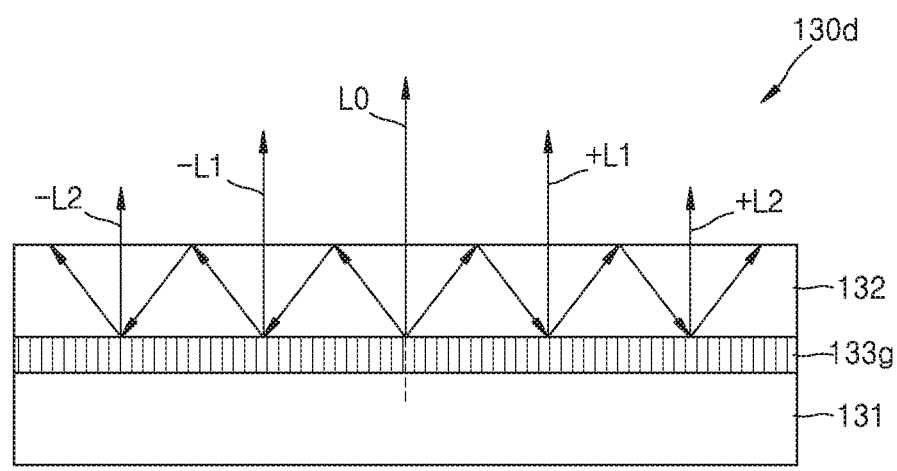
FIG. 8 is a cross-sectional view schematically showing the configuration and operation of an aperture enlargement film according to another example embodiment.

In addition, FIG. 8 is a cross-sectional view schematically showing the configuration and operation of an aperture enlargement film 130d according to another example embodiment. Referring to FIG. 8, the aperture enlargement film 130d may include the fifth grating layer 133e and the light guide layer 132 disposed on the upper surface of the fifth grating layer 133e. The aperture enlargement film 130d may be disposed such that the fifth grating layer 133e faces the light exiting surface of the spatial light modulator 120. In addition, the aperture enlargement film 130d may further include the substrate 131 for supporting the fifth grating layer 133e and the light guide layer 132 such that the light guide layer 132 and the fifth grating layer 133e do not bend. For example, the substrate 131 may be disposed on the lower surface of the fifth grating layer 133e.

The fifth grating layer 133e illustrated in FIG. 8 is the same as the fifth grating layer 133e illustrated in FIG. 5. Therefore, a portion of a light beam transmitted from each aperture 121 of the spatial light modulator 120 is 0th order diffracted on the lower surface of the fifth grating layer 133e and is perpendicularly incident on the lower surface of the light guide layer 132. The light beam perpendicularly incident on the lower surface of the light guide layer 132 passes through the light guide layer 132 as is, and is emitted in a direction normal to the upper surface of the light guide layer 132. Then, the remaining portion of the light beam transmitted from each aperture 121 of the spatial light modulator 120 is 1st diffracted on the lower surface of the fifth grating layer 133e and obliquely travels in the lateral direction along the light guide layer 132.

In a process of traveling inside of the light guide layer 132 in the lateral direction through total reflection, a portion of the light beam may be diffracted by the upper surface of the fifth grating layer 133e and again be incident perpendicularly on the lower surface of the light guide layer 132. The light beam incident on the aperture enlargement film 130d from the spatial light modulator 120 is divided into the plurality of light beams −L2, −L1, L0, +L1, and +L2 in this way, and is output from the aperture enlargement film 130d.

Figure 9A:
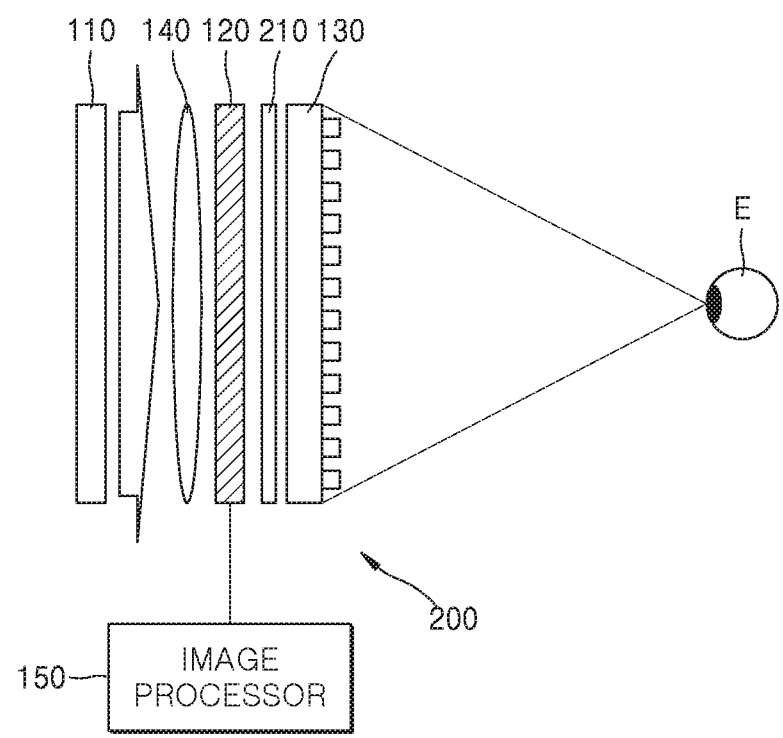
FIGS. 9A and 9B are configuration diagrams schematically showing a configuration of holographic display apparatuses according to another example embodiment.

FIG. 9A is a configuration diagram schematically showing a configuration of a holographic display apparatus 200 according to another example embodiment. Referring to FIG. 9A, the holographic display apparatus 200 includes all of the components of the holographic display apparatus 100 shown in FIG. 1, and may further include a Gaussian apodization filter array 210 which is disposed to face the light exiting surface of the spatial light modulator 120. For example, the Gaussian apodization filter array 210 may be disposed between the spatial light modulator 120 and the aperture enlargement film 130.

As described above, the backlight unit 110 provides a collimated uniform coherent illumination light to the spatial light modulator 120. For example, the illumination light incident on the spatial light modulator 120 has a uniform intensity distribution. In addition, a light beam passing through the aperture 121 of the spatial light modulator 120 also has a uniform intensity distribution. Accordingly, in the case of the example embodiment shown in FIG. 1, the intensity distribution of the light beam enlarged by the aperture enlargement film 130 may be a stepwise distribution, not a curved Gaussian distribution.

The Gaussian apodization filter array 210 may be configured to convert the uniform intensity distribution of the light beam emitted from the aperture 121 of the spatial light modulator 120 into the curved Gaussian distribution. The Gaussian apodization filter array 210 may include a plurality of Gaussian apodization filters arranged two-dimensionally. The Gaussian apodization filters may correspond one-to-one with the apertures 121 of the spatial light modulator 120, respectively. Then, the intensity of each light beam that passes through the Gaussian apodization filter array 210 and is incident on the aperture enlargement film 130 may have the curved Gaussian distribution. Therefore, the intensity distribution of each light beam enlarged by the aperture enlargement film 130 may also have the curved Gaussian distribution.

For example, the Gaussian apodization filter may be a reverse apodizing filter with light reflection coating or light absorption coating. In the Gaussian apodization filter, the light reflection coating or the light absorption coating may be formed to have the highest transmittance in the center and a transmittance that gradually reduces in the radial direction such that the intensity distribution of a transmitted light may have a Gaussian profile. For example, the Gaussian apodization filter may be formed by coating a reflective metal such that the coating thickness gradually increases from the center toward the periphery in the radial direction. The size of the Gaussian apodization filter may be the same as the pixel size of the spatial light modulator 120.

The Gaussian apodization filter array 210 may be provided in the form of a separate layer or a separate film, but may be integrally formed with a color filter array of the spatial light modulator 120. For example, in a process of manufacturing the color filter array of the spatial light modulator 120, the Gaussian apodization filter array 210 may be integrally formed on the surface of the color filter array by coating the reflective metal on the surface of each color filter corresponding to each pixel of the spatial light modulator 120 in the manner as described above.

Figure 9B:
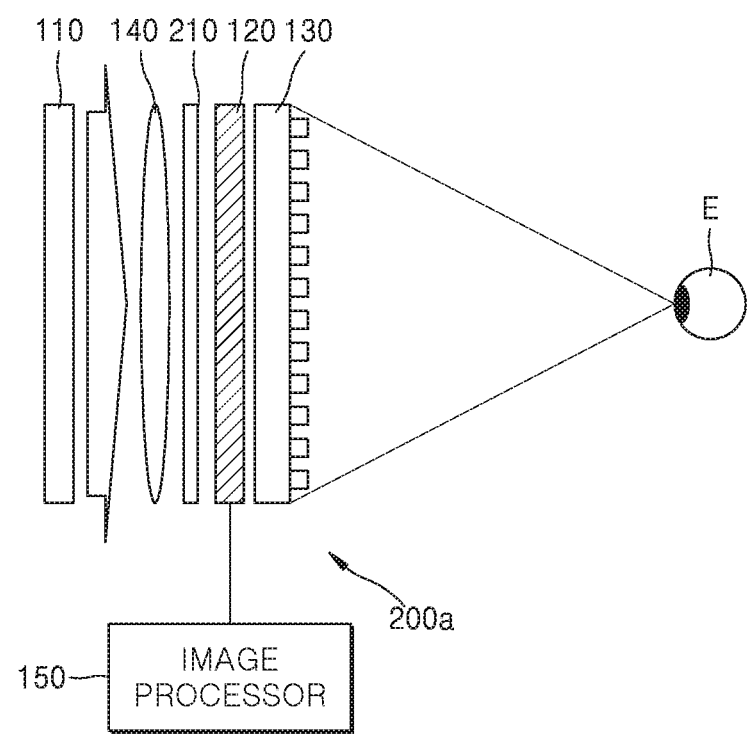

FIG. 9B is a configuration diagram schematically showing a configuration of a holographic display apparatus 200a according to another example embodiment. Referring to FIG. 9B, the holographic display apparatus 200a includes all of the components of the holographic display apparatus 100 shown in FIG. 1, and may further include the Gaussian apodization filter array 210 which is disposed to face the light entering surface of the spatial light modulator 120. For example, the Gaussian apodization filter array 210 may be disposed between the backlight unit 110 and the spatial light modulator 120.

Compared to the holographic display apparatus 200 shown in FIG. 9A, the holographic display apparatus 200a shown in FIG. 9B differs only in the position of the Gaussian apodization filter array 210. In the example embodiment shown in FIG. 9B, the Gaussian apodization filter array 210 generates an illumination light of a uniform intensity emitted from the backlight unit 110 into a plurality of light beams having an intensity distribution in the form of a Gaussian distribution. A plurality of light beams having the intensity distribution in the form of the Gaussian distribution may be respectively incident on the corresponding apertures 121 of the spatial light modulator 120. Then, each light beam passing through the aperture 121 of the spatial light modulator 120 and incident on the aperture enlargement film 130 may have an intensity of a curved Gaussian distribution. Therefore, the intensity distribution of each light beam enlarged by the aperture enlargement film 130 may also have a curved Gaussian distribution.

Figure 10A:
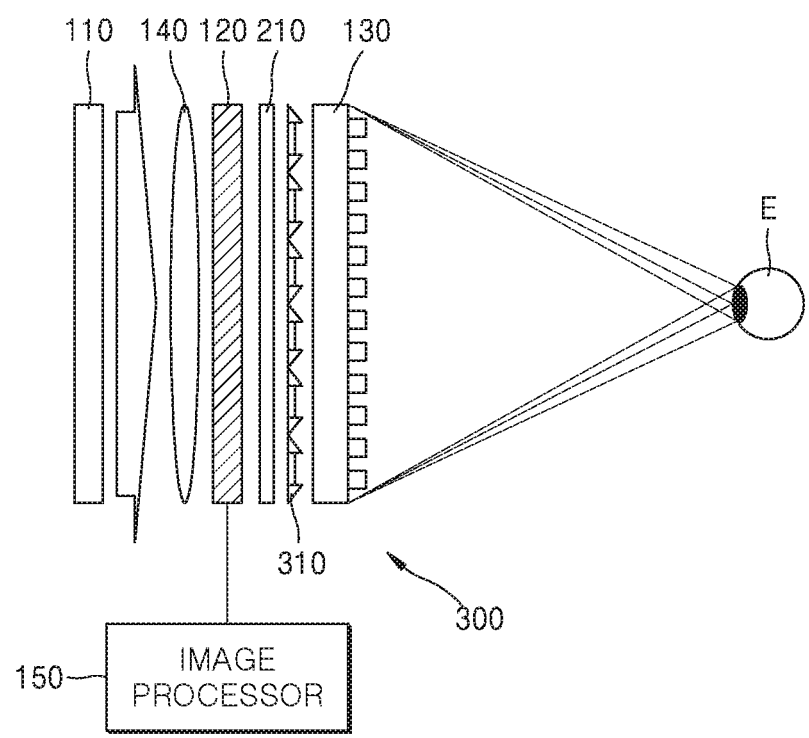
FIGS. 10A and 10B are configuration diagrams schematically showing a configuration of holographic display apparatuses according to another example embodiment.

FIG. 10A is a configuration diagram schematically showing a configuration of a holographic display apparatus 300 according to another example embodiment. Referring to FIG. 10A, the holographic display apparatus 300 includes all of the components of the holographic display apparatus 200 shown in FIG. 9A, and may further include a prism array 310. For example, the prism array 310 may be disposed between the Gaussian apodization filter array 210 and the aperture enlargement film 130. The Gaussian apodization filter array 210 may be disposed to face the light entering surface of the spatial light modulator 120 as shown in FIG. 9B or may be omitted as shown in FIG. 1. In this case, the prism array 310 may be disposed between the spatial light modulator 120 and the aperture enlargement film 130.

Figure 10B:
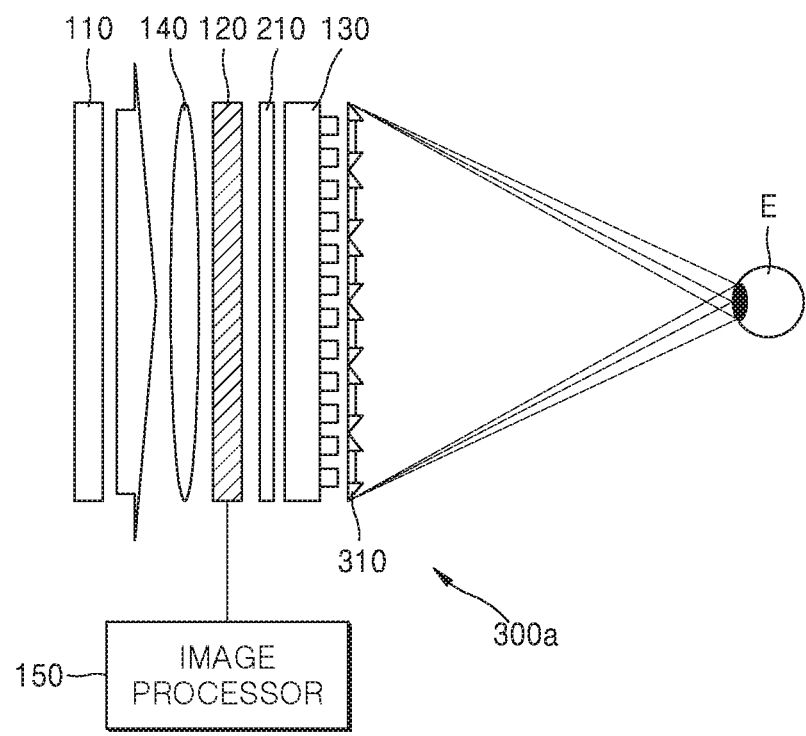

FIG. 10B is a configuration diagram schematically showing a configuration of a holographic display apparatus 300a according to another example embodiment. Compared to the holographic display apparatus 300 shown in FIG. 10A, the holographic display apparatus 300a shown in FIG. 10B differs only in the position of the prism array 310. For example, referring to FIG. 10B, the prism array 310 may be disposed to face the light exiting surface of the aperture enlargement film 130.

Figure 11:
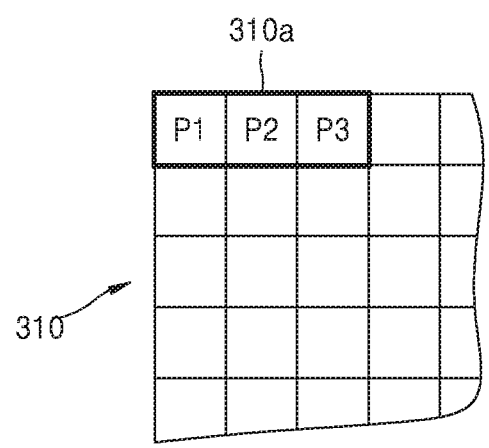
FIG. 11 shows an arrangement of a plurality of prisms of a prism array of the holographic display apparatuses shown in FIGS. 10A and 10B.

The prism array 310 may include a plurality of prisms that allow incident light to travel in different directions. For example, FIG. 11 shows an arrangement of a plurality of prisms P1, P2, and P3 of the prism array 310 of the holographic display apparatuses 300 and 300a shown in FIGS. 10A and 10B. Referring to FIG. 11, the prism array 310 may be divided into a plurality of unit regions 310a arranged two-dimensionally. Each unit region 310a may include the plurality of prisms P1, P2, and P3 that allow incident light to travel in different directions. Accordingly, the prism array 310 may include the plurality of prisms P1, P2, and P3 arranged repeatedly. For example, among the plurality of prisms P1, P2, and P3, the first prism P1 may be configured to change the traveling direction of the incident light to a first direction, the second prism P2 may be configured to change the traveling direction of the incident light to a second direction different from the first direction, and the third prism P3 may be configured to change the traveling direction of the incident light in a third direction different from the first and second directions.

In FIG. 11, each unit region 310a includes prisms of a 1×3 arrangement, but is not necessarily limited thereto. As described later, the prism arrangement in each unit region 310a may be differently selected according to the number of holographic images of different viewpoints simultaneously provided by the holographic display apparatuses 300 and 300a. For example, when the holographic display apparatuses 300 and 300a provide four holographic images of different viewpoints in the horizontal direction, each unit region 310a may include prisms of a 1×4 arrangement. Further, when the holographic display apparatuses 300 and 300a provide four holographic images of different viewpoints in the transverse direction and the longitudinal direction, each unit region 310a may include prisms of a 2×2 arrangement.

Figure 12:
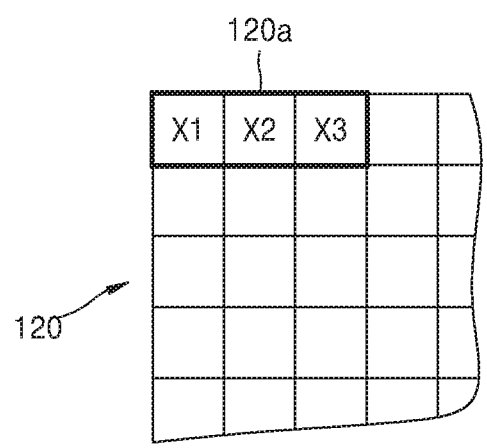
FIG. 12 shows an arrangement of a plurality of pixels of a spatial light modulator of the holographic display apparatuses shown in FIGS. 10A and 10B.

Each of the prisms P1, P2, and P3 of the prism array 310 may correspond one-to-one with each pixel of the spatial light modulator 120. For example, FIG. 12 shows an arrangement of a plurality of pixels of the spatial light modulator 120 of the holographic display apparatuses 300 and 300a shown in FIGS. 10A and 10B. Referring to FIG. 12, the spatial light modulator 120 includes the plurality of pixels that are two-dimensionally arranged. In addition, the spatial light modulator 120 may include a plurality of unit regions 120a arranged two-dimensionally. The unit regions 120a of the spatial light modulator 120 may have the same arrangement form as the unit regions 310a of the prism array 310. For example, when the unit region 310a of the prism array 310 includes the prisms P1, P2, and P3 of a 1×3 arrangement, the unit region 120a of the spatial light modulator 120 may include pixels X1, X2, and X3 of the 1×3 arrangement.

The plurality of pixels X1, X2, and X3 may operate to reproduce holographic images having different viewpoints. For example, among the plurality of pixels X1, X2, and X3, the first pixel X1 may operate to reproduce a holographic image of a first viewpoint, the second pixel X2 may operate to reproduce a holographic image of a second viewpoint different from the first viewpoint, and the third pixel X3 may operate to reproduce a holographic image of a third viewpoint different from the first and second viewpoints. To this end, the image processor 150 may be configured to provide a first hologram data signal for the holographic image of the first viewpoint to the first pixel X1, a second hologram data signal for the holographic image of the second viewpoint to the second pixel X2, and a third hologram data signal for the holographic image of the third viewpoint to the third pixel X3.

In FIG. 12, each unit region 120a only includes the pixels of the 1×3 arrangement, but is not necessarily limited thereto. The pixel arrangement in each unit region 120a may be differently selected according to the number of holographic images of different viewpoints to be simultaneously provided by the holographic display apparatuses 300 and 300a. For example, when the holographic display apparatuses 300 and 300a provide four holographic images of different viewpoints in the horizontal direction, each unit region 120a only includes pixels of a 1×4 arrangement. In addition, when the holographic display apparatuses 300 and 300a provide four holographic images of different viewpoints in the horizontal and vertical directions, each unit region 120a may include pixels of a 2×2 arrangement.

In the configuration of the prism array 310 and the spatial light modulator 120 illustrated in FIGS. 11 and 12, the first pixel X1 may be disposed to face the first prism P1, the second pixel X2 may be disposed to face the second prism P2, and the third pixel X3 may be disposed to face the third prism P3. Then, the holographic image of the first viewpoint reproduced through the first pixel X1 travels in the first direction by the first prism P1, the holographic image of the second viewpoint reproduced through the second pixel X2 travels in the second direction by the second prism P2, and the holographic image of the third viewpoint reproduced through the third pixel X3 travels in the third direction by the third prism P3. As a result, three holographic images having different viewpoints are focused on the focal plane of the Fourier lens 140 at different positions.

Figure 13:
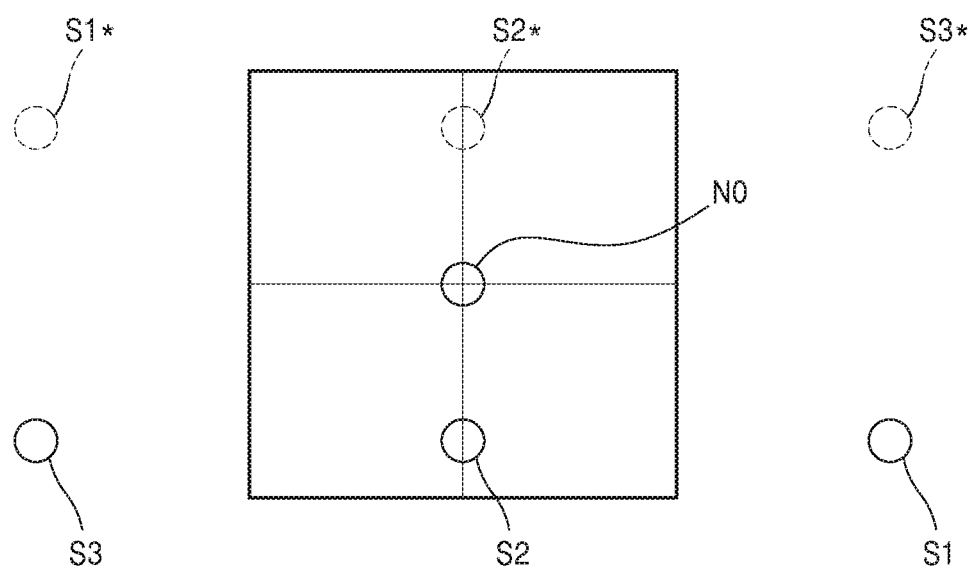
FIG. 13 shows the distribution of light formed on the focal plane of a Fourier lens by the holographic display apparatuses shown in FIGS. 10A and 10B.

For example, FIG. 13 shows the distribution of light formed on the focal plane of the Fourier lens 140 by the holographic display apparatuses 300 and 300a shown in FIGS. 10A and 10B. Referring to FIG. 13, the 0th order noise N0 appears in the center of the focal plane of the Fourier lens 140. In FIG. 13, a square indicated by a solid line is a boundary of a viewing window determined by a pixel period of the spatial light modulator 120. As described above, using the aperture enlargement film 130 may prevent the high order noise N1 from appearing along the boundary of the viewing window. Then, the first holographic image signal S1 by the first pixel X1 and the first prism P1, the second holographic image signal S2 by the second pixel X2 and the second prism P2, and the third holographic image signal S3 by the third pixel X3 and the third prism P3 appear. Also, first complex conjugate image signal S1*, the second complex conjugate image signal S2*, and the third complex conjugate image signal S3* appear at symmetrical positions with respect to the first holographic image signal S1, the second holographic image signal S2, and the third holographic image signal S3 around on the 0th order noise N0.

As illustrated in FIG. 13, the first holographic image signal S1 whose travel direction changes by the first prism P1 and the third holographic image signal S3 whose travel direction changes by the third prism P3 may be located outside the boundary of the viewing window determined by the pixel period of the spatial light modulator 120. Accordingly, using the prism array 310 may further enlarge the viewing window determined by the pixel period of the spatial light modulator 120 beyond the limit range of the viewing window, and an observer may view the holographic image in a wider region Further, because the high order noise N1 does not appear between the first holographic image signal S1 and the second holographic image signal S2 and between the second holographic image signal S2 and the third holographic image signal S3, when the observer's eye E moves from the first holographic image signal S1 to the second holographic image signal S2 or from the second holographic image signal S2 to the third holographic image signal S3, the observer may view a holographic image of a naturally changed viewpoint without being disturbed by high order noise N1.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
a spatial light modulator comprising a plurality of pixels disposed two-dimensionally; and
an aperture enlargement film configured to enlarge a beam diameter of a light beam transmitted from each of the plurality of pixels of the spatial light modulator,
wherein the aperture enlargement film comprises a light guide layer disposed to face a light exiting surface of the spatial light modulator and an one grating layer disposed on an upper surface of the light guide layer, and
wherein the light guide layer and the one grating layer are configured to transmit a 0th order diffracted light beam and a 1st order diffracted light beam among incident light beams from the spatial light modulator,
wherein the one grating layer is configured to transmit the $0^{th}$ order diffracted light beam of a light beam vertically incident on the lower surface of the one grating layer from the light guide layer in a direction perpendicular to an upper surface of the one grating layer, and is configured to reflect the 1st order diffracted light beam of the light beam incident on the lower surface of the one grating layer from the light guide layer at an angle to propagate obliquely in the light guide layer,
wherein the one grating layer transmit a portion of the $1^{st}$ order diffracted light beam that is reflected by a lower surface of the light guide layer and obliquely incident on the one grating layer in the direction perpendicular to the upper surface of the one grating layer, and
wherein a boundary of the transmitted 1st order diffracted light beam coincides with a boundary of the transmitted 0th order diffracted light beam or the transmitted 1st order diffracted light beam overlaps with the transmitted 0th order diffracted light beam based on a thickness of the light guide layer, and
wherein an intensity of the transmitted 0th order diffracted light beam is greater than the intensity of the transmitted 1st order diffracted light beam.

2. The holographic display apparatus of claim 1, wherein the spatial light modulator comprises a plurality of apertures and a black matrix surrounding each of the plurality of apertures.

3. The holographic display apparatus of claim 2, wherein an intensity distribution of the enlarged light beam decreases from a center of the enlarged light beam to a periphery of the enlarged light beam.

4. The holographic display apparatus of claim 2, wherein a beam diameter of the enlarged light beam is greater than a width of each of the plurality of apertures of the spatial light modulator.

5. The holographic display apparatus of claim 1, wherein a beam diameter of the enlarged light beam is greater than a pixel period of the spatial light modulator.

6. The holographic display apparatus of claim 1, wherein a thickness of the light guide layer ranges from 1 μm to 5 μm.

7. The holographic display apparatus of claim 1, wherein the light guide layer is configured to obliquely propagate the second light beam from the one grating layer along an inside of the light guide layer based on total reflection.

8. The holographic display apparatus of claim 1, wherein the aperture enlargement film comprises a substrate configured to support the light guide layer and the one grating layer such that the light guide layer and the one grating layer do not bend, and
wherein a refractive index of the light guide layer is greater than a refractive index of the substrate.

9. The holographic display apparatus of claim 1, further comprising a backlight unit configured to provide a coherent collimated illumination light to the spatial light modulator, and a Fourier lens configured to focus a holographic image reproduced by the spatial light modulator on a space.

10. The holographic display apparatus of claim 1, further comprising a Gaussian apodization filter array disposed between the light exiting surface of the spatial light modulator and the aperture enlargement film or disposed to face a light entering surface of the spatial light modulator.

11. The holographic display apparatus of claim 10, wherein the Gaussian apodization filter array comprises a plurality of Gaussian apodization filters configured to convert an intensity distribution of a light beam into a curved Gaussian distribution.

12. The holographic display apparatus of claim 1, further comprising a prism array disposed between the spatial light modulator and the aperture enlargement film or disposed to face a light exiting surface of the aperture enlargement film.

13. The holographic display apparatus of claim 12, wherein the prism array is divided into a plurality of unit regions that are two-dimensionally disposed, and
wherein each of the plurality of unit regions comprises a plurality of prisms configured to propagate an incident light in different directions.

14. The holographic display apparatus of claim 13, wherein the plurality of prisms included in the prism array correspond one-to-one to the plurality of pixels included in the spatial light modulator.

15. The holographic display apparatus of claim 14, wherein a first pixel of the spatial light modulator corresponding to a first prism of each of the plurality of unit regions of the prism array is configured to reproduce a holographic image of a first viewpoint, and a second pixel of the spatial light modulator corresponding to a second prism of each of the plurality of unit regions of the prism array is configured to reproduce a holographic image of a second viewpoint different from the first viewpoint.

16. A holographic display apparatus comprising:
a spatial light modulator comprising a plurality of pixels disposed two-dimensionally, the plurality of pixels comprising a plurality of apertures, respectively; and
an aperture enlargement film configured to enlarge a beam diameter of a light beam transmitted from each of the plurality of pixels of the spatial light modulator,
wherein a beam diameter of the enlarged light beam is greater than a width of each of the plurality of apertures,
wherein the aperture enlargement film comprises a light guide layer disposed to face a light exiting surface of the spatial light modulator and an one grating layer disposed on an upper surface of the light guide layer, and
wherein the light guide layer and the one grating layer are configured to transmit a 0th order diffracted light beam and a 1st order diffracted light beam among incident light beams from the spatial light modulator,
wherein the one grating layer is configured to transmit the 0th order diffracted light beam of a light beam vertically incident on the lower surface of the one grating layer from the light guide layer in a direction perpendicular to an upper surface of the one grating layer, and is configured to reflect the 1 st order diffracted light beam of the light beam incident on the lower surface of the one grating layer from the light guide layer at an angle to propagate obliquely in the light guide layer,
wherein the one grating layer transmit a portion of the $1^{st}$ order diffracted light beam that is reflected by a lower surface of the light guide layer and obliquely incident on the one grating layer in the direction perpendicular to the upper surface of the one grating layer,
wherein a boundary of the transmitted 1st order diffracted light beam coincides with a boundary of the transmitted 0th order diffracted light beam or the transmitted 1st order diffracted light beam overlaps with the transmitted 0th order diffracted light beam based on a thickness of the light guide layer, and
wherein an intensity of the transmitted 0th order diffracted light beam is greater than the intensity of the transmitted 1st order diffracted light beam.

* * * * *